United States Patent Office 3,376,192
Patented Apr. 2, 1968

3,376,192
10,11-DIHYDRO-5H-DIBENZO[a,d]CYCLOHEP-TENES AS LOCAL ANESTHETICS
Paul Greengard, New York, N.Y., assignor to Geigy Chemical Corporation, Ardsley, N.Y., a corporation of New York
No Drawing. Continuation-in-part of application Ser. No. 267,324, Mar. 12, 1963. This application Oct. 22, 1965, Ser. No. 502,303
11 Claims. (Cl. 167—52)

This application is a continuation-in-part of application, Ser. No. 267,324, filed Mar. 12, 1963, now abandoned.

This invention relates to a process for obtaining a local anesthetic effect by administering to a host requiring local anesthesia certain derivatives of 10,11-dihydro-5H-dibenzo[a,d]cycloheptene (or dibenzo[a,d]cyclohepta-1,4-diene) and their acid addition and quaternary ammonium salts, and to compositions useful for this purpose.

More specifically, the process described employs certain esters and amides of 10,11-dihydro-5H-dibenzo[a,d]-cycloheptene-5-carboxylic acid which can be represented by the following structural formula:

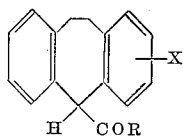

wherein
X is hydrogen or halogen, particularly, chlorine or bromine
R represents N-(lower)alkyl - N - hydroxy(lower)alkylamino or the moieties —OZ or —NHZ in which Z stands for (lower) alkylamino(lower)alkyl, di(lower)-alkylamino(lower)alkyl, 1-piperidyl(lower)alkyl and 3-(N-methylpiperidyl)

and the pharmaceutically acceptable acid addition salts and quaternary ammonium salts thereof.

The term "lower alkyl" as used herein means saturated monovalent aliphatic radicals of the general formula —$C_mH_{2m+1}$ wherein $m$ designates an integer of less than 5 and is inclusive of both straight chain and branched chain radicals.

Representative compounds within the scope of the above formula which have been found to possess local anesthetic properties to a favorable degree are particularly the following:

2-dimethylaminoethyl 10,11-dihydro-5H-dibenzo-[a,d]cycloheptene-5-carboxylate hydrochloride,
2-diethylaminoethyl 10,11-dihydro-5H-dibenzo-[a,d]cycloheptene-5-carboxylate hydrochloride,
3-diethylaminopropyl 10,11-dihydro-5H-dibenzo-[a,d]cycloheptene-5-carboxylate hydrochloride,
2-dimethylaminoethyl 3-chloro-10,11-dihydro-5H-dibenzo[a,d]cycloheptene-5-carboxylate hydrochloride,
2-methylaminoethyl 10,11-dihydro-5H-dibenzo-[a,d]cycloheptene-5-carboxylate hydrochloride,
2-(10,11-dihydro-5H-dibenzo[a,d]cycloheptene-5-carboxy)ethyldiethylmethylammonium iodide,
2-(10,11-dihydro-5H-dibenzo[a,d]cycloheptene-5-carboxy)ethyldimethyloctylammonium bromide,
2-(1-piperidylethyl)-10,11-dihydro-5H-dibenzo-[a,d]cycloheptene-5-carboxylate hydrochloride,
N-methyl-3-piperidyl 3-chloro-10,11-5H-dibenzo-[a,d]cycloheptene-5-carboxylate hydrochloride,
N-ethyl-N-(2-hydroxyethyl)-10,11-dihydro-5H-dibenzo-[a,d]cycloheptene-5-carboxamide,
N-2-(diethylaminoethyl)-10,11-dihydro-5H-dibenzo-[a,d]cycloheptene-5-carboxamide hydrochloride.

The compounds defined by the above formula can be made by the following modes of preparation:

5-carboxylate derivatives can be formed by refluxing 10,11 - dihydro-5H-dibenzo[a,d]cycloheptene-5-carboxylic acid with a basically substituted lower alkyl halide in a lower alkanolic medium furnished, e.g. by methanol, ethanol, propanol, etc., from about 2 hours to about 20 hours and preferably, for about 12 hours.

Alternatively, such 5-carboxylate derivatives are prepared by refluxing a 10,11-dihydro-5H-dibenzo[a,d]-cycloheptene-5-carboxylic acid halide with a basically substituted lower alkanol in a reaction medium such as is provided by benzene, chloroform, carbon tetrachloride, carbon disulfide, etc. for from about 1 hour to about 20 hours and preferably for about 2 hours.

5-carboxylate derivatives of Formula I wherein R is mono(lower)alkylamino(lower)alkyl may be prepared, for instance, by dealkylation of the corresponding di-(lower)alkylamino(lower)alkyl as for example, by treatment with ethyl chlorocarbonate to form a urethane derivative which upon saponification gives the desired dealkylated compound.

Alternatively, treatment of an acid halide as mentioned above, with a secondary amino(lower)alkanol in a reaction medium constituted by such solvents as benzene, chloroform, carbon tetrachloride, carbon disulfide, etc. lasting for from about 1 hour to about 20 hours and preferably for about 4 hours, yields an N-(lower)alkyl-N-hydroxy(lower)alkyl - 10,11 - dihydro-5H-dibenzo[a,d]-cycloheptene-5-carboxamide which is also encompassed by the above formula and which when subjected to concentrated hydrochloric acid can be converted to the mono(lower)alkylamino(lower)alkyl esters.

5-carboxamide derivatives are made by refluxing the carboxylic acid halides, mentioned above, with an appropriately substituted lower alkylene diamine, in a reaction medium exemplified by benzene, chloroform, carbon tetrachloride, carbon disulfide, etc. for about 1 hour to about 20 hours and preferably about 2 hours.

The starting materials are either commercially available, as for example, the above mentioned alkyl halides and alkanols or, as in the case of the above identified 5-carboxylic acid and 5-carboxylic acid halide derivatives, can be readily prepared in accordance with well known prior art syntheses.

The present invention comprehends not only the above described derivatives of 10,11-dihydro-5H-dibenzo[a,d]-cycloheptene in their free base form, but it also includes pharmaceutically acceptable non-toxic acid addition salts which may be formed from said compounds in accordance with conventional practice, by using appropriate inorganic and organic acids, such as hydrohalic acids, especially hydrochloric and hydrobromic acids, sulfuric, ethanesulfonic and phosphoric acids as well as acetic, aminoacetic, lactic, succinic, malic, aconitic, phthalic, tartaric acids, etc.

The pharmaceutically acceptable quaternary ammonium salts of compounds of the present invention, can be obtained by addition to the corresponding free bases of alkyl or aralkyl esters of inorganic sulfonic acids, including such compounds as methyl chloride, methyl bromide, methyl iodide, ethyl bromide, propyl bromide, octyl bromide, benzyl chloride, benzyl bromide, methyl sulfate, methyl benzenesulfonate, and methyl p-toluenesulfonate, giving the methochloride, methobromide, methoiodide, ethobromide, propobromide, octobromide, benzochloride, benzobromide, methosulfate, methobenzenesulfonate, and metho-p-toluene sulfonate salts, respectively.

The methods for the preparation of these compounds can be exemplified more fully by the following illustrative examples. The temperatures therein are given in degrees centigrade.

Example 1.—2-dimethyl 10,11-dihydro-5H-dibenzo[a,d] cycloheptene-5-carboxylate hydrochloride 10,11 - dihydro - 5H - dibenzo[a,d]cycloheptene - 5-carboxylic acid (11.9 g., 0.05 mole) was dissolved in 200 ml. of benzene. To the solution was added 50 ml. of thionyl chloride. The mixture was refluxed for 18 hours and then concentrated in vacuo to an oily residue which was taken up in benzene and again concentrated to a syrup. The syrup was dissolved in 100 ml. of benzene and 4.4 g. (0.05 mole) of dimethyl-aminoethanol in 50 ml. of benzene was added dropwise at room temperature. The reaction was stirred and refluxed for 4 hours. The reaction mixture was cooled and the desired compound was filtered off as white crystals. After recrystallization from ethanol it melted at 210–212°. Yield: 7 g.

Analysis for $C_{20}H_{24}ClNO_2$: Calc'd C, 69.47; H, 6.99; N, 4.05. Found C, 69.39; H, 7.04; N, 4.08.

Example 2.—2-diethylaminoethyl 10,11-dihydro-5H-dibenzo[a,d]cycloheptene-5-carboxylate hydrochloride 10,11 - dihydro - 5H - dibenzo[a,d]cycloheptene - 5-carboxylic acid (10.70 g., 0.045 mole) and 6.10 g. (0.045 mole) of 2-diethylaminoethyl chloride in 90 ml. of dry isopropanol were heated to reflux for 12 hours. Upon cooling in ice the reaction product (16.47 g.) precipitated. After recrystallization from the same solvent and washing with absolute ether and drying, the desired compound melted at 195–197°, $\gamma KBr$ C=O 1740 cm.$^{-1}$.

Analysis for $C_{22}H_{28}ClNO_2$: Calc'd C, 70.66; H, 7.56; N, 3.75. Found C, 70.35; H, 7.77; N, 3.49.

Example 3.—3-diethylaminopropyl 10,11-dihydro-5H-dibenzo[a,d]cycloheptene-5-carboxylate hydrochloride This compound was prepared in accordance with the method described in Example 1 using 8 g., (0.033 mole) of carboxylic acid and 4 g. (0.033 mole) of 3-diethylamino-1-propanol; M.P. 147–148°; yield 3.5 g.

Example 4.—2 - dimethylaminoethyl 3 - chloro - 10,11-dihydro - 5H - dibenzo[a,d]cycloheptene - 5 - carboxylate hydrochloride Using 13.5 g. (0.05 mole) of 3-chloro-10,11-dihydro-5H-dibenzo[a,d]cycloheptene-5-carboxylic acid and 4.4 g. (0.05 mole) of dimethylaminoethanol, 10 g. of this compound were prepared, M.P. 215–216°, in accordance with the method given in Example 1.

Example 5.—2 - methylaminoethyl 10,11 - dihydro - 5H-dibenzo[a,d]cycloheptene-5-carboxylate hydrochloride monohydrate 10,11 - dihydro - 5H - dibenzo[a,d]cycloheptene - 5-carboxylic acid (6 g., 0.024 mole) were dissolved in 80 cc. of benzene and treated with 10 cc. of thionyl chloride. The mixture was refluxed for 18 hours and concentrated to a syrupy residue which was taken up in benzene and again concentrated to a syrup. The syrup was dissolved in 50 cc. of benzene and 3.9 g. of 2-methylaminoethanol in 20 cc. of benzene was added at 5°. The reaction mixture was stirred and refluxed for 6 hours. The reaction mixture was cooled and 100 cc. of water was added. The benzene layer was separated and dried over $Na_2SO_4$. The reaction mixture was filtered and after concentration an oil was obtained. It was N-methyl-N-(2-hydroxyethyl)-10,11 - dihydro - 5H - dibenzo[a,d]cycloheptene - 5 - carboxamide, which was suspended in 2 g. of concentrated hydrochloric acid. The mixture was warmed at 80° for 30 minutes, cooled and diluted with 60 cc. of ethanol. The mixture was then concentrated in vacuo and an oil was obtained upon cooling which crystallized out. After recrystallization from a mixture of ethyl acetate and isopropanol, 9:1, 0.5 g. of the desired compound was obtained; M.P. 170–171°.

Analysis for $C_{19}H_{24}ClNO_3$: Calc'd C, 65.32; H, 6.92; N, 4.00. Found C, 65.63; H, 7.04; N, 3.83.

Example 6.—2 - (10,11 - dihydro - 5H - dibenzo[a,d] cycloheptene - 5 - carboxy) - ethyldiethylmethylammonium iodide The compound of Example 2 (7.90 g., 0.21 mole) was dissolved in 25 ml. 2 N ice cold NaOH and extracted thrice with 100 ml. of ether. The combined extracts were dried over $K_2CO_3$, evaporated to 50 ml. and treated dropwise with 3.12 ml. (0.05 mole) freshly distilled methyl iodide in 50 ml. of absolute ether at 0° under vigorous stirring. The resulting precipitate, 7.89 g. of white crystals was filtered and recrystallized from acetone and ether, M.P. 156–158°, $\gamma KBr$ C=O 1740 cm.$^{-1}$.

Analysis for $C_{23}H_{30}INO_2$: Calc'd C, 57.70; H, 6.31; N, 2.92. Found C, 57.68; H, 6.46; N, 2.82.

Example 7.—2 - (10,11 - dihydro - 5H - dibenzo[a,d] cycloheptene - 5 - carboxy) - ethyldimethyloctylammonium bromide 2 - dimethylaminoethyl 10,11-dihydro-5H-dibenzo[a,d] cycloheptene-5-carboxylate hydrochloride (5 g.) was dissolved in 15 ml. of water. The solution was cooled to 5°; the pH adjusted to 10 with 10% NaOH and the liberated oil was extracted with ether. The ether extract was dried over anhydrous $Na_2SO_4$. Concentration of the dried extract gave 4 g. of 2-dimethylaminoethyl 10,11-dihydro-5H-dibenzo[a,d]cycloheptene-5-carboxylate.

2-dimethylaminoethyl 10,11-dihydro-5H-dibenzo[a,d]-cycloheptene-5-carboxylate (4 g.) was dissolved in 100 ml. of dry acetone. To the solution was added the equivalent amount of octyl bromide (2.8 g.). The mixture was refluxed for 28 hours and then concentrated. The oily residue that was obtained crystallized on addition of ether (cooling). After recrystallization from a mixture of ethyl acetate and ether, the desired ammonium salt melted at 85–87°; yield 2.5 g.

Analysis for $C_{28}H_{40}BrNO_2$: Calc'd C, 66.95; H, 8.19; N, 2.78. Found C, 67.24; H, 8.21; N, 3.01.

Example 8.—2-(1-piperidylethyl)-10,11-dihydro - 5H - dibenzo[a,d]cycloheptene - 5 - carboxylate hydrochloride monohydrate By following the procedure of Example 1 and using (4 g., 0.016 mole) of the carboxylic acid and 3.8 g. (twice amount) of N-2-hydroxyethyl piperidine 0.7 g. of the desired compound, M.P. 104–105°, was obtained.

Example 9.—N-methyl-3-piperidyl 3-chloro-10,11 - dihydro-5H-dibenzo[a,d]cycloheptene-5-carboxylate hydrochloride Using 5.4 g. (0.02 mole) of 3-chloro-10,11-dihydro-5H-dibenzo[a,d]cycloheptene-5-carboxylic acid and 4.6 g. of 3-hydroxy-N-methylpiperidine, 3.5 g. of the desired compound, M.P. 249–250°, were produced in analogy to above described preparative methods.

Example 10.—N-ethyl-N-(2-hydroxyethyl) - 10,11 - dihydro-5H-dibenzo[a,d]cycloheptene-5-carboxamide 10,11-dihydro-5H - dibenzo[a.d]cycloheptene - 5 - carboxylic acid (4 g., 0.016 mole) was dissolved in 80 cc. of benzene and treated with 10 cc. of thionyl chloride. The mixture was refluxed for 18 hours and concentrated to a syrupy residue which was taken up in benzene and again concentrated to a syrup. The syrup was dissolved in 50 cc. of benzene and 2.7 g. (0.032 mole) (twice the amount) of 2-ethylamino ethanol in 20 cc. of benzene was added at room temperature. The reaction mixture was stirred and refluxed for 6 hours. The reaction mixture was cooled and 25 cc. of water was added. The benzene layer was separated and dried over $Na_2SO_4$.

The reaction mixture was filtered and after concentration an oil was obtained. After recrystallization from ethyl-acetate, it melted at 114–115°. Yield: 1.5 g.

Analysis for $C_{20}H_{23}NO_2$: Calc'd C, 77.38; H, 7.79; N, 4.51. Found C, 77.15; H, 7.49; N, 4.78.

Example 11.—N-2-(diethylaminoethyl) - 10,11 - dihydro-5H - dibenzo[a,d]cycloheptene - 5 - carboxamide hydrochloride monohydrate 10,11-dihydro-5H - dibenzo[a,d]cycloheptene - 5 - carboxylic acid (9.2 g., 0.04 mole) was dissolved in 160 ml. of benzene and treated slowly with 20 ml. of thionyl chloride. The mixture was refluxed for 18 hours and concentrated to a syrupy residue in vacuo, which was taken up in benzene and again concentrated to a syrup. The syrup was dissolved in 100 ml. of benzene and 4.7 g. (0.04 mole) of N,N-diethylethylenediamine in 500 ml. of benzene were added dropwise at room temperature. The reaction mixture was stirred and refluxed for 4 hours. Upon cooling crystals separated, which, after recrystallization from a mixture of isopropanol and ethanol (8:2) melted at 133–135°; yield 6.7 g.

Analysis for $C_{22}H_{31}ClN_2O_2$: Calc'd C, 67.76; H, 8.00; N, 7.16. Found C, 67.79; H, 8.35; N, 7.00.

As mentioned above, the compounds described herein can be employed to produce a local anesthetic effect in a host—animals or humans—requiring anesthesia. Local anesthetic activity can be determined by infiltration and conduction anesthesia experiments.

Infiltration anesthesia (guinea pig wheals) experiments are conducted as follows:

By pricking the dorsal skin of a shaved guinea pig with a pin, a contraction of the muscle is obtained; this serves as a stimulus and response for testing compounds injected intradermally. A volume of 0.25 ml. of test solution is injected. Six one-inch wheals are made on each animal, three on a side parallel with the spinal column. The wheals are circled with ink and pricked at 5-minute intervals to determine duration of effect. The minimal concentration that produces anesthesia without irritation is determined. Saline controls are used. Reference drugs are: Procaine (in saline) 20 min.–90 min. (0.5%)—no irritation; dibucaine (in saline) 15 min.–120 min. (0.25%)—no irritation; lidocaine, 15 min.–95 min. (2%)—no irritation.

Conduction anesthesia can be determined by using the sciatic nerve block test in mice. The procedure is as follows: 3 male mice, weighing 18–22 g. are used for each compound, per dose level with varying concentrations. (Volume administered is always 0.05 cc.). A sharp 27 gauge, ½-inch hypodermic needle is used. A landmark for the entrance of the needle is the trochanter of the femur, and the level of the needle should face the vertebral column. The needle is inserted in such a manner as to be virtually in contact with the sciatic nerve. Before the injection, which is given rapidly, the leg is held in a lightly stretched position; upon completion of the injection the tip of the index finger is pressed over the injection site and the pressure is maintained for approximately five to ten seconds. The mice become paddle-footed and the toes cupped. Depending upon the intensity of anesthesia, the foot may become inverted. The ipsilateral flexor reflex may be lost. The mice lose their grip in the treated leg and there is no pain response to light pinching of the muscle in and radiating from the injected area. Onset and duration of anesthesia are noted and compared with a standard which is lidocaine HCl:

| Concentration | Minutes | |
|---|---|---|
| | Onset | Duration |
| 1.0% | 1/16 | 27 |
| .5% | 1/16 | 26 |
| .1% | ½ | 14–17 |
| 0.05% | 1/16–½ | 9 |

The results obtained are summarized in the following tables in an illustrative and comparative manner:

TABLE I.—INFILTRATION ANESTHESIA
(GUINEA PIG WHEALS)

| Compound | Concentration | In Minutes | |
|---|---|---|---|
| | | Onset | Duration |
| Example 1 [1] | 2%(d./w.+HCl) | 3 | 105 |
| Do | 1% | 3 | 120 |
| Do | 0.5% | 3 | 120 |
| Do | 0.25% | 3 | 30–60 |
| Lidocaine HCl | 2% | 3 | 75 |
| Example 3 | 2% | 3 | 90 |
| Lidocaine HCl | 2% | 3 | 75 |
| Example 4 | 2% | 10 | 120 |
| Lidocaine HCl | 2% | 3 | 75 |
| Example 5 | 2% | 3 | 90 |
| Lidocaine HCl | 2% | 3 | 75 |
| Example 6 | 1% | 3 | 75 |
| Do | 0.5% | 3 | 90 |
| Lidocaine HCl | 2% | 3 | 75 |
| Example 8 | 2% | 3 | 90 |
| Do | 1% | 3 | 90 |
| Lidocaine HCl | 2% | 3 | 75 |
| Example 9 | 2% | 9 | 45 |
| Lidocaine HCl | 2% | 3 | 45 |
| Example 10 | 2% | 12 | 75 |
| Lidocaine HCl | 2% | 3 | 90 |
| Example 11 | 2% | 3 | 75 |
| Lidocaine HCl | 2% | 3 | 90 |

TABLE II.—CONDUCTION ANESTHESIA
(SCIATIC NERVE BLOCK)

| Compound | Concentration | In Minutes | |
|---|---|---|---|
| | | Onset | Duration |
| Example 1 [1] | 1% | 1/16 | 105 |
| Lidocaine HCl | 1% | 1/16 | 27½ |
| Example 1 [2] | 0.1% | ½ | 28 |
| Lidocaine HCl | 0.1% | ½ | 17 |
| Example 1 | 0.1% | ⅛ | 29½ |
| Lidocaine HCl | 0.1% | ⅛ | 14 |
| Example 1 | 0.05% | 1/16–4 | 24 |
| Do | 0.005% | 1/16 | 2 |
| Do | 0.05% | 1/16 | 18 |
| Lidocaine HCl | 0.05% | 1/16–½ | 9 |
| Example 1 | 0.0075% | 1/16 | 29 |
| Lidocaine HCl | 1% | 1/16 | 36 |
| Example 1 | 1% | 1/16 | 243 |
| Do | 0.1% | 1/16 | 20 |
| Lidocaine HCl | 0.1% | 1/16 | 18 |
| Example 2 | 1% | 1/16 | 300 |
| Lidocaine HCl | 1% | 1/16 | 19 |
| Example 4 | 0.1% | ½–3 | 23 |
| Do | 0.05% | ½–2 | 269 |
| Lidocaine HCl | 0.1% | 1/16 | 6 |
| Do | 0.5% | 1/16 | 26 |
| Example 6 | 1% | Delayed Onset [3] | 120 |
| Example 7 | 1% | Delayed Onset [3] | 120 |
| Example 9 | 0.1% | 1–14 | 29 |
| Do | 0.1% | ½–1 | 27 |
| Do | 0.5% | ¾–3 | 480 |

[1] This compound seems to produce more widespread anesthesia than lidocaine HCl at same dose.
[2] Degree of anesthesia is greater with this compound than with lidocaine HCl.
[3] Onset of "potent" action is more delayed than with lidocaine HCl, however, anesthetic effect is longer lasting.

From the above tables it will be seen that the compound of Example 1, for instance, has the same speed of onset of action as lidocaine, is more potent than lidocaine and has considerable longer duration of action than lidocaine. A number of the other subject compounds also compare favorably with lidocaine.

The compounds useful in practicing this invention are relatively non-toxic and therefore compatible with their intended use as local anesthetics. For example, the compound of Example 1 has an $LD_{50}$ i.p. in mice of 170 mg./kg. and its $LD_{50}$ i.v. in mice is 36 mg./kg., while the corresponding data for lidocaine are: 185 mg./kg. i.p. and 20 mg./kg. i.v.

The anesthetics of the invention can be administered by any of the conventional means available for use in conjunction with pharmaceuticals. They preferably are used in the form of a composition comprising a vehicle such as an organic solvent. Such compositions include sterile solutions for irrigation, subcutaneus injection, and dispersions of the compounds in an oil emulsion, jelly, ointment, or cream base, or aerosols either alone or in combination with other therapeutic agents, such as, antihistamines, sulfa drugs and antibiotics. All such are included herein in the term "vehicle."

The concentration of the active ingredient in the pharmaceutical composition can be varied as desired to meet the need. The concentration will depend in part upon the amount of the compositions that is conveniently administered. A lesser amount of a sterile solution would be administered subcutaneously than might be applied topically in the form of an oil, emulsion, jelly, ointment, cream or aerosols. In most cases, concentrations ranging from 0.001% to about 5% by weight will be quite adequate.

Useful pharmaceutical formulations for administration of the compounds of the invention are as follows:

Formula A.—Solution for subcutaneous administration

| Component: | Percent |
|---|---|
| Active ingredient | 1 |
| Benzyl alcohol | 0.9 |
| Water for injection, q.s. | |

Formula B

| Gelled composition: | |
|---|---|
| Active ingredient | 1 |
| Metuocel | 4.25 |
| Propylene glycol | 20 |
| Distilled water, q.s. | |

Formula C

| Cream: | |
|---|---|
| Active ingredient | 1 |
| Propylene glycol | 57 |
| Carbowax 6000 | 42 |

The compounds of the invention can also be employed in the form of troches and lozenges, and they can be dispensed as dry powders suitable for admixing in pharmaceutical carrier immediately prior to administartion.

When used for the treatment of mucous membrane anesthesia, the active ingredient is best incorporated in an aqueous spray. This spray is prepared by dissolving the compound in an aqueous medium, bringing the pH to within the range of about 6.5 to about 7.2, preferably 6.7 to 7.1, with a base such as alkali metal hydroxide, for example sodium hydroxide. Effective anesthesia is obtained with a concentration as low as 0.5% (w./v.), but it is usually preferably to employ somewhat more, within the range from about 1% to about 5%. Preserves such as combinations of methyl paraben, ethyl paraben, propyl paraben can also be incorporated.

What is claimed is:

1. A process for locally anesthetizing which comprises administering to an animal and human host requiring local anesthesia a compound of the formula

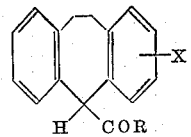

wherein

X is selected from the group consisting of hydrogen and halogen;

R is selected from the group consisting of N-(lower) alkyl-N-hydroxy(lower)alkylamino and —OZ and —NHZ in which Z is selected from the group consisting of (lower)alkylamino(lower)alkyl, di(lower) alkylamino(lower)alkyl, 1-piperidyl(lower)alkyl and 3-(N-methylpiperidyl)

or the pharmaceutically acceptable acid addition salts or pharmaceutically acceptable quaternary ammonium salts thereof.

2. A process in accordance with claim 1 in which the compound is 2-dimethylaminoethyl 10,11-dihydro-5H-dibenzo[a,d]cycloheptene-5-carboxylate hydrochloride.

3. A process in accordance with claim 1 in which the compound is 2-(10,11-dihydro-5H-dibenzo[a,d]cycloheptene-5-carboxy)ethyldimethyloctylammonium bromide.

4. A process in accordance with claim 1 in which the compound is 2-(10,11-dihydro-5H-dibenzo[a,d]cycloheptene-5-carboxy)ethyldiethylmethylammonium iodide.

5. A process in accordance with claim 1 in which the compound is 2-dimethylaminoethyl 3-chloro-10,11-dihydro - 5H-dibenzo[a,d]cycloheptene-5-carboxylate hydrochloride.

6. A process in accordance with claim 1 in which the compound is N-methyl-3-piperidyl 3-chloro-10,11-dihydro - 5H-dibenzo[a,d]cycloheptene-5-carboxylate hydrochloride.

7. A process in accordance with claim 1 in which the compound is N-2-(diethylaminoethyl)-10,11-dihydro-5H-dibenzo[a,d]cycloheptene-5-carboxamide hydrochloride.

8. A process in accordance with claim 1 in which the compound is 2-(1-piperidylethyl) 10,11-dihydro-5H-dibenzo[a,d]cycloheptene-5-carboxylate hydrochloride.

9. A process is accordance with claim 1 in which the compound is 3-diethylaminopropyl 10,11-dihydro-5H-dibenzo[a,d]cycloheptene-5-carboxylate hydrochloride.

10. A process in accordance with claim 1 in which the compound is 2-methylaminoethyl 10,11-dihydro-5H-dibenzo[a,d]cycloheptene-5-carboxylate hydrochloride.

11. A process for locally anesthetizing which comprises administering to an animal host requiring local anesthesia a compound selected from the group consisting of esters and amides having the formula

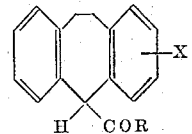

wherein

X is selected from the group consisting of hydrogen and halogen

R is selected from the group consisting of N-(lower)-alkyl-N-hydroxy(lower)alkylamino and —OZ and —NHZ in which Z is selected from the group consisting of (lower)alkylamino(lower)alkyl, di(lower) alkylamino(lower)alkyl, 1-piperidyl(lower)alkyl and 3-(N-methylpiperidyl)

and the pharmaceutically acceptable acid addition salts and pharmaceutically acceptable quaternary ammonium salts thereof.

References Cited

UNITED STATES PATENTS 3,271,248   9/1966   Renault _____ 167—52
3,294,635   12/1966   Thesing _____ 167—52

ALBERT T. MEYERS, *Primary Examiner.*

JULIAN S. LEVITT, SAM ROSEN, *Examiners.*

JEROME D. GOLDBERG, *Assistant Examiner.*